(12) United States Patent
Wu et al.

(10) Patent No.: US 11,025,105 B2
(45) Date of Patent: Jun. 1, 2021

(54) MOTOR STATOR AND PERMANENT MAGNET SYNCHRONOUS SUBMERSIBLE MOTOR

(71) Applicant: AILift (Tianjin) Science Co., Ltd., Tianjin (CN)

(72) Inventors: Shu Wu, Tianjin (CN); Bin Wang, Tianjin (CN)

(73) Assignee: AILIFT (TIANJIN) SCIENCE CO., LTD., Tianjin (CN)

( * ) Notice: Subject to any disclaimer, the term of this patent is extended or adjusted under 35 U.S.C. 154(b) by 320 days.

(21) Appl. No.: 16/172,885

(22) Filed: Oct. 29, 2018

(65) Prior Publication Data

US 2019/0386527 A1 Dec. 19, 2019

(30) Foreign Application Priority Data

Jun. 14, 2018 (CN) .......................... 201820928369.2

(51) Int. Cl.
| | |
|---|---|
| H02K 1/02 | (2006.01) |
| H02K 21/14 | (2006.01) |
| H02K 5/132 | (2006.01) |
| H02K 1/16 | (2006.01) |
| E21B 43/12 | (2006.01) |
| H02K 1/27 | (2006.01) |

(52) U.S. Cl.
CPC .......... *H02K 1/165* (2013.01); *E21B 43/128* (2013.01); *H02K 1/02* (2013.01); *H02K 1/276* (2013.01); *H02K 5/132* (2013.01); *H02K 21/14* (2013.01)

(58) Field of Classification Search
CPC .......... H02K 1/165; H02K 1/02; H02K 1/276; H02K 5/132; H02K 21/14; E21B 43/128
See application file for complete search history.

(56) References Cited

U.S. PATENT DOCUMENTS

| | | | |
|---|---|---|---|
| 7,560,835 B2 * | 7/2009 | Greening ................. | H02K 3/28 |
| | | | 310/12.22 |
| 2016/0211717 A1 * | 7/2016 | Honda .................... | H02K 1/148 |
| 2018/0233970 A1 * | 8/2018 | de Souza ............... | H02K 16/02 |

* cited by examiner

*Primary Examiner* — Jianchun Qin
(74) *Attorney, Agent, or Firm* — Bayramoglu Law Offices LLC

(57) ABSTRACT

The present invention is a permanent magnet synchronous submersible motor comprised of a motor stator and a rotor core. The motor stator includes a stator core formed by laminating a plurality of stator punching sheets. Each of the stator punching sheets is provided with an odd number of stator slots and any two of a X-phase coil, a Y-phase coil and a Z-phase coil are wound in each of the stator slots. The rotor core is formed by laminating a plurality of rotor punching sheets wherein each of the rotor punching sheets is provided with rotor slots and a permanent magnet inserted into each of the rotor slots. Furthermore, the permanent magnet submersible motor can be started with a conventional V/F controlled (variable frequency) converter.

19 Claims, 7 Drawing Sheets

MOTOR STATOR AND PERMANENT MAGNET SYNCHRONOUS SUBMERSIBLE MOTOR

CROSS-REFERENCE TO RELATED APPLICATION

The present application claims priority to Chinese Patent Application Number 201820928369.2, filed with the Chinese Patent Office on Jun. 14, 2018, and entitled "Motor Stator and Permanent Magnet Synchronous Submersible Motor", which is incorporated herein by reference in its entirety.

TECHNICAL FIELD

The present disclosure relates to the technical field of permanent magnet synchronous submersible motors and a motor stator.

BACKGROUND

A submersible (electric) motor (a motor capable of being immersed in oil or functioning while submerged) is a power machine for an electric submersible pump, which drives a submersible centrifugal pump to pump underground well fluid. In the prior art, the submersible motor belongs to AC asynchronous motors and has substantially the same structure as an ordinary asynchronous motor. However, in order for an electric submersible pump to be adapted to the special operating environment, the submersible motor also has a special structure mainly consisting of an elongated fixed part (stator) and a rotating part (rotor). The submersible pump has an overall look of an elongated steel pipe and is mainly composed of a tubular housing, a motor shaft and a cable. The housing has a diameter within the range of 90 mm-160 mm and the motor shaft has a length of about 6 meters-12 meters, depending on the magnitude of the power. Thus, the submersible pump has an elongated motor structure.

The existing submersible motors have a low power factor. Also, the existing submersible motors absorb a large amount of reactive current from the power grid resulting in a large amount of reactive current in electric transmission and transformation equipment and power generation equipment of the power grid, thereby decreasing the quality factor of the power grid and increasing the load of the power grid, the power transmission and transformation equipment, and the power generation equipment. Moreover, the reactive current consumes some of the electrical energy in the power grid, the power transmission and transformation equipment, and the power generation equipment, resulting in reduced power grid efficiency and adversely affecting the effective utilization of electrical energy. Furthermore, the existing permanent magnet submersible motors cannot be started directly by a V/F-controlled (variable frequency) converter, which therefore does not meet the use requirement of using a conventional V/F-controlled (variable frequency) converter with a permanent magnet submersible motor.

SUMMARY

An object of the present disclosure is to provide a motor stator and a permanent magnet synchronous submersible motor which solves the technical problems in the prior art that submersible motors have a low power factor, low motor efficiency, high energy consumption, and the permanent magnet submersible motors cannot be directly started with conventional VT-controlled (variable frequency) converters.

The present disclosure provides a motor stator, comprising a stator core formed by laminating a plurality of stator punching sheets;

wherein each of the stator punching sheets is provided with an odd number of stator slots and any two of a X-phase coil, a Y-phase coil and a Z-phase coil are wound in each of the stator slots.

Further, each of the stator slots is a closed stator slot, and a shortest distance between the stator slot and an inner wall of each of the stator punching sheets constituting an empty circle is 0.2 mm-0.5 mm.

Further, the stator slots are 15 in number and are uniformly distributed on a circumference of each of the stator punching sheets.

Further, the shortest distance between the stator slot and the inner wall of each of the stator punching sheets constituting an empty circle is 0.2 mm.

Further, each of the stator slots is a pear-shaped slot.

The present disclosure further provides a permanent magnet synchronous submersible motor, comprising a rotor core formed by laminating a plurality of rotor punching sheets and the motor stator as described above;

wherein each of the rotor punching sheets is provided with rotor slots in which a permanent magnet is inserted.

Further, the rotor slots are four in number and are elongated in shape, wherein a straight line, where a midperpendicular of a long side of the rotor slot, intersects a central axis of one corresponding rotor punching sheet, and the four rotor slots are uniformly distributed on a circumference of each of the rotor punching sheets.

Further, the permanent magnet is neodymium iron boron or samarium cobalt and the neodymium iron boron or samarium cobalt is inserted at a center position of each of the rotor slots.

Further, a rotor stopper (rotor baffle block) is fixedly provided at either end of the rotor core and the rotor stopper has a thickness of 2 mm-3 mm.

Further, the rotor core has ten segments in total, wherein adjacent segments of the rotor core are connected by a centralizing bearing (i.e. stabilizing/alignment bearing), and a motor shaft is fitted into a cavity formed by the ten segments of the rotor core.

Compared with the prior art, the motor stator and the permanent magnet synchronous submersible motor provided by the present disclosure have the following advantageous effects.

The motor stator provided by the present disclosure comprises a stator core formed by laminating a plurality of circular stator punching sheets, wherein the number of stator slots on the stator punching sheets is set to an odd number and when compared with the conventional design in which the number of stator slots is an even number, this design greatly suppresses the harmonic effect of the submersible motor, enables a more uniform distribution of airgap magnetic field of the motor, improves the performance and power factor of the submersible motor, and enables the permanent magnet submersible motor to be normally started without a vector control.

In addition, when the present disclosure of the invention is compared with the conventional design which has only a one-phase coil wound in each stator slot, the present invention having any two of a X-phase coil, a Y-phase coil and a Z-phase coil wound in each of the stator slots, greatly improves the utilization rate of the motor materials, facilitates the selection of the most advantageous pitch such that the rotating magnetic field of the submersible motor is closer to a sine wave, is beneficial to heat dissipation and increases mechanical strength and the temperature of the submersible motor under continuous operation is maintained within an acceptable range and thereby improves the service life of the submersible motor.

Also, the permanent magnet synchronous submersible motor provided by the present disclosure comprises a rotor core and the motor stator as described above, wherein the rotor core is formed by laminating a plurality of circular rotor punching sheets. A conventional AC asynchronous motor is modified into a permanent magnet synchronous motor by providing a permanent magnet rather than a copper conducting bar into the rotor slots of each of the rotor punching sheets, such that an excitation magnetic field of the submersible motor is provided by the permanent magnet. Therefore, the rotor does not need an excitation current. Furthermore, the motor has no copper loss of rotor, the efficiency of the submersible motor is improved and compared with an asynchronous motor, electric energy is saved at any rotational speed point. This advantage is especially obvious when the rotational speed is relatively low. In addition, by replacing the rotor winding with a permanent magnet, as compared with an induction motor, the permanent magnet motor has a greatly enhanced airgap magnetic field and significantly reduced volume and weight, thereby reducing the consumption of manufactured materials and production costs. Other technical advantages of the permanent magnet synchronous submersible motor provided by the present disclosure are the same as the technical advantages of the motor stator as described above, which will not be described herein.

BRIEF DESCRIPTION OF THE DRAWINGS

In order to more clearly illustrate the embodiments of the present disclosure, a brief description of the drawings is given below. Obviously, the following drawings are only illustrative of some of the embodiments of the present disclosure and for a person of ordinary skill in the art, other drawings may be obtained from these drawings without inventive effort.

Figure 1:
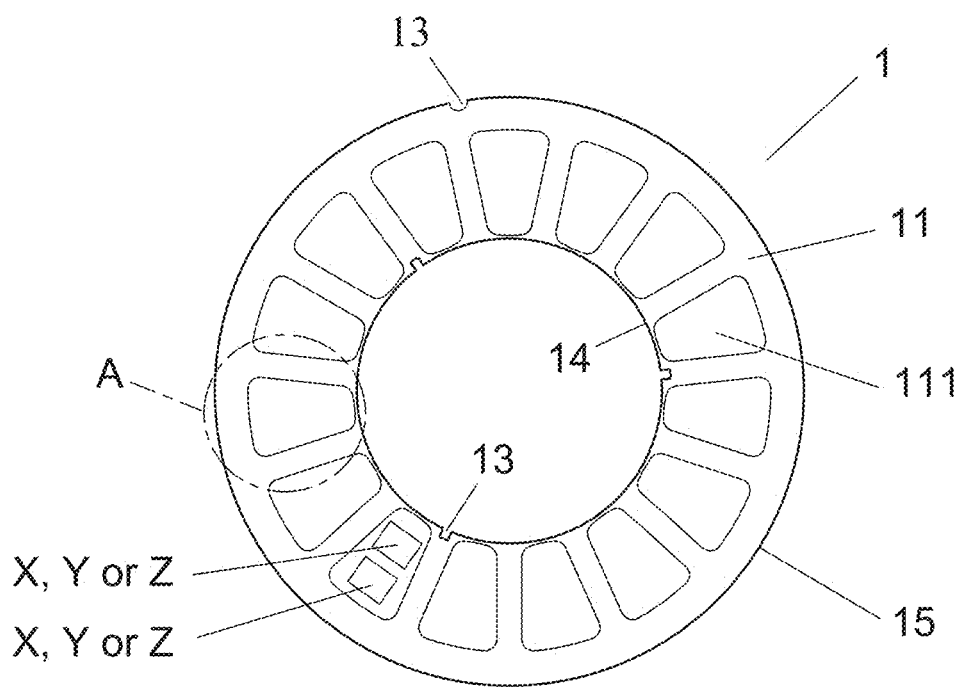
FIG. 1 is a schematic structural diagram of a stator core in a motor stator according to an embodiment of the present disclosure.

Reference signs: 1—stator core; 2—rotor core; 3—permanent magnet; 4—epoxy resin; 5—motor shaft; 6—centralizing bearing; 7—housing; 11—stator punching sheet; 12—first positioning grooves; 13—second positioning groove; 14—inner wall of the stator punching sheet; 15—outer wall of the stator punching sheet; 16—cavity; 21—rotor punching sheet; 22—rotor stopper; 111—stator slot; and 211—rotor slot.

DETAILED DESCRIPTION

The technical solutions of the present disclosure will be clearly and completely described below with reference to the drawings. Obviously, the embodiments described are only some of the embodiments of the present disclosure, rather than all of the embodiments. All other embodiments that are obtained by a person of ordinary skill in the art on the basis of the embodiments of the present disclosure without inventive effort shall be covered by the protective scope of the present disclosure.

In the description of the present disclosure, it is to be noted that the orientational or positional relation denoted by the terms such as "center", "upper", "lower", "left", "right", "vertical", "horizontal", "inner" and "outer" is based on the orientation or position relationship indicated by the figures, which only serves to facilitate describing the present disclosure and simplify the description, rather than indicating or suggesting that the device or element referred to must have a particular orientation, or is constructed or operated in a particular orientation, and therefore cannot be construed as a limitation on the present disclosure. In addition, the terms "first", "second" and "third" merely serve the purpose of description and should not be understood as an indication or implication of relative importance.

In the description of the present disclosure, it should be noted that unless otherwise explicitly specified and defined, the terms "install", "link" and "connect" shall be understood in the broadest sense, which may, for example, refer to fixed connection, detachable connection or integral connection; may refer to mechanical connection or electrical connection; may refer to direct connection or indirect connection by means of an intermediate medium; and may refer to communication between two elements. A person of ordinary skill in the art would understand the specific meaning of the terms in the present disclosure according to specific situations.

As shown in FIG. 1, FIG. 2, FIG. 5 and FIG. 6, an embodiment of the present disclosure provides a motor stator, comprising a stator core 1 formed by laminating a plurality of stator punching sheets 11; wherein each of the stator punching sheets 11 is provided with an odd number of stator slots 111, and any two of a X-phase coil, a Y-phase coil and a Z-phase coil are wound in each of the stator slots 111.

The motor stator provided by an embodiment of the present disclosure comprises a stator core 1 formed by laminating a plurality of circular stator punching sheets 11, wherein the number of stator slots 111 provided on each of the stator punching sheets 11 is set to an odd number. When compared with the conventional design which has an even number of stator slots 111, the embodiment of the present disclosure greatly suppresses the harmonic effect of the submersible motor, enables a more uniform distribution of airgap magnetic field of the motor, improves the performance and power factor of the submersible motor, and enables the permanent magnet submersible motor to be normally started without a vector control.

In addition, when the present disclosure of the invention is compared with the conventional design which has only a one-phase coil wound in each stator slot, the present invention having any two of a X-phase coil, a Y-phase coil and a Z-phase coil wound in each of the stator slots, greatly improves the utilization rate of the motor materials, facilitates the selection of the most advantageous pitch such that the rotating magnetic field of the submersible motor is closer to a sine wave, is beneficial to heat dissipation and increases mechanical strength and the temperature of the submersible motor under continuous operation is maintained within an acceptable range and thereby improves the service life of the submersible motor.

Specifically, the parameters of the submersible motor designed in this embodiment are as follows: a rated voltage of 2500 V, a rated rotational speed of 3600 rpm, a rated power of 200 HP, a rated torque of 390 Nm, and variable frequency starting (frequency conversion starting). Based on the above parameters, by adopting the present inventions above mentioned structure, the embodiment of the present submersible motor design, compared with an existing submersible motor with the same parameters, obtained the following: the rated power factor of the motor is improved, which reduces the cost of power factor compensation, and the power consumption is reduced by about 26%, which reduces the operation cost of the power grid. Moreover, the volume of the submersible motor in this embodiment is reduced by 50%, the amount of material is reduced by 50%, and the weight is reduced by about 50%.

It should also be noted that the stator punching sheets 11 used in this embodiment are silicon steel sheets having excellent performance. In order to ensure the underground working strength of the submersible motor, the housing 7 enclosing the stator core 1 is made of high-quality carbon structural steel and therefore has sufficient strength and serves the function of support and connection.

In addition, the X-phase coil, the Y-phase coil and the Z-phase coil may be wound in a mixed manner, or may be provided independently of each other. Preferably, in the present embodiment, the X-phase coil, the Y-phase coil and the Z-phase coil are provided independently of each other, and the stator winding adopts a double-layer lap winding method.

Specifically, in the present embodiment, the specific structure of the motor stator is further described in detail below.

Figure 2:
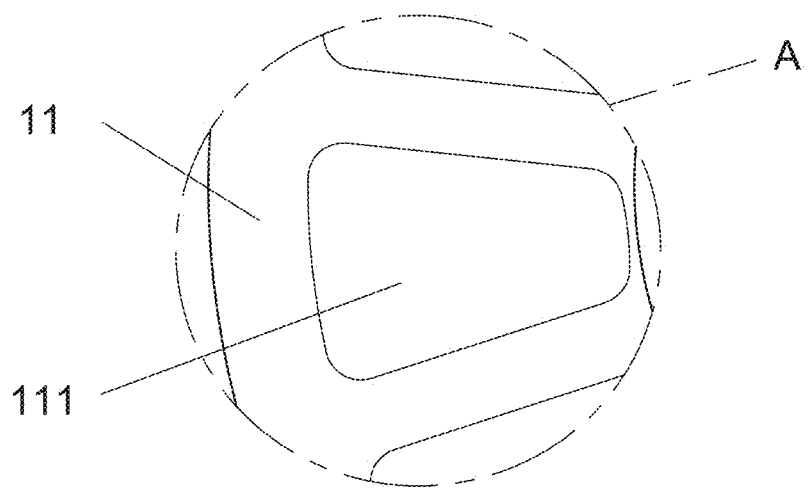
FIG. 2 is an enlarged view A of FIG. 1.

First, as shown in FIG. 1 and FIG. 2, in this embodiment, it is further arranged that each of the stator slots 111 is a closed stator slot 111 and a shortest distance between the stator slot 111 and an inner wall 14 of each of the stator punching sheets 11 constituting an empty circle is 0.2 mm-0.5 mm.

That is, the stator slot 111 in this embodiment is not provided with an opening, or by a complicated machining process. The minimum thickness between the inner wall of the stator slot 111 and the inner wall of each of the stator punching sheets 11 is 0.2 mm-0.5 mm. In such a case, in combination with the dual-phase winding design of the stator slots 111, the internal harmonic waves of the submersible motor are greatly reduced, the cogging effect is weakened, the electromagnetic compatibility performance of the submersible motor is improved, the mechanical vibration is reduced, the noise is reduced, and the stability of the submersible motor is improved.

Specifically, the smaller minimum thickness (hereinafter referred to as lap width (overlap/lapping)) between the inner wall of the stator slot 111 and the inner wall of each of the stator punching sheets 11 leads to lower mechanical vibration, lower noise and higher stability of the submersible motor during operation. As a preferred solution of the present embodiment, as shown in FIG. 2, the minimum distance between the stator slot 111 and the inner wall of each of the stator punching sheets 11 forming an empty circle is set to 0.2 mm, provided that the processing and manufacturing can be completed.

Further, as shown in FIG. 1, it is further arranged that the stator slots 111 are 15 in number and are uniformly distributed on a circumference of each of the stator punching sheets 11.

Specifically, in this embodiment, each of the stator punching sheets 11 is set to have an outer diameter of about 100 mm and an inner diameter of about 52 mm. With this size, the design of 15 stator slots 111 can further suppress the harmonic effect of the motor, enabling a more uniform distribution of airgap magnetic d of the motor and improves the performance and power factor of the motor.

As a preferred solution of the present embodiment, each of the stator slots 111 is further set to be a pear-shaped slot, so as to reduce the magnetic leakage of the submersible motor.

Specifically, in this embodiment, it is arranged that the radius of two arcs of the pear-shaped slot are respectively 4.2 mm and 5.95 mm, the distance between the two circle centers is 8.2 mm, the straight line where the two circle centers lie intersects the central axis of one corresponding stator punching sheet 11, and the arc with the smaller radius is arranged to be closer to the center of the stator punching sheets 11.

It should be noted that in this embodiment, two first positioning grooves 12 are further provided on the inner wall of each of the stator punching sheets 11, and one second positioning groove 13 is provided on the outer wall 15 of each of the stator punching sheets 11, wherein the first positioning groove are for positioning the stator punching sheets 11 at the time of laminating the plurality of stator punching sheets 11, and the second positioning groove serves to facilitate the fitting and positioning between the stator core 1 and the housing.

Specifically, in this embodiment, it is arranged that the first positioning groove is a square groove having a length of 1.6 mm and a width of 1.6 mm, and the second positioning groove is a semicircular groove having a radius of 1.575 mm.

Figure 3:
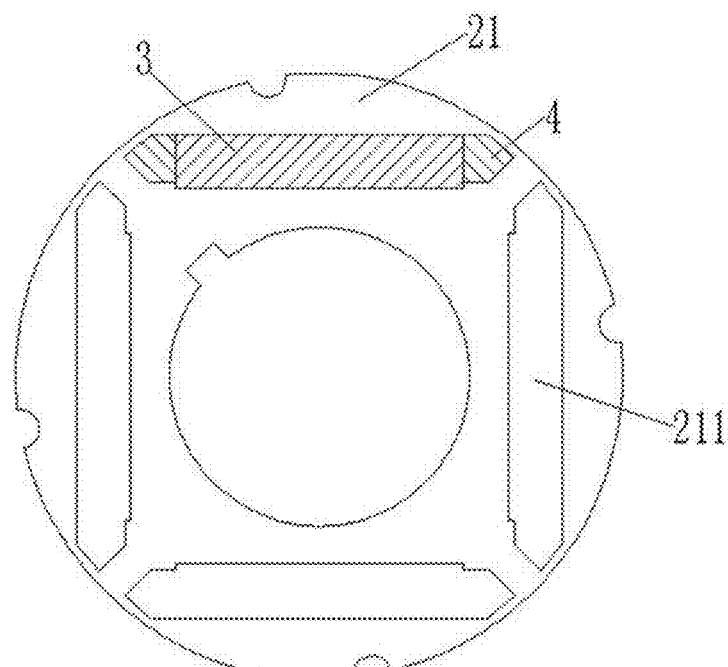
FIG. 3 is a schematic structural diagram of a rotor punching sheet in a permanent magnet synchronous submersible motor according to an embodiment of the present disclosure.
Figure 4:
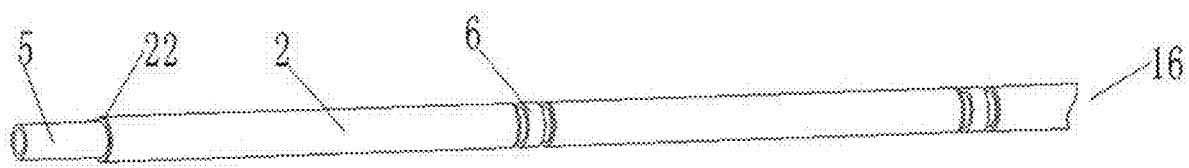
FIG. 4 is a partial structural diagram of a rotor winding and a motor shaft in a permanent magnet synchronous submersible motor according to an embodiment of the present disclosure.
Figure 5:
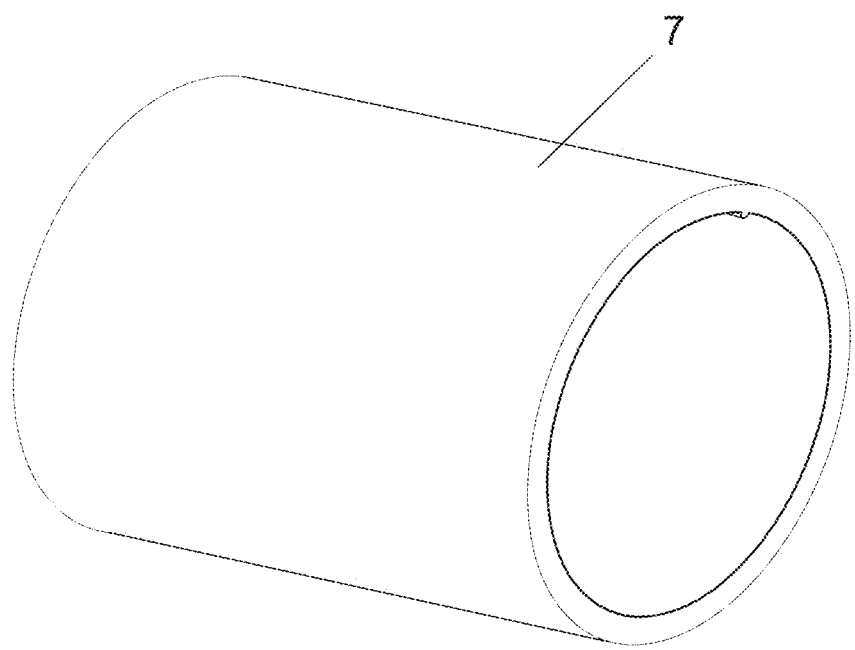
FIG. 5 is a schematic structural diagram of a housing enclosing the stator core.
Figure 6:
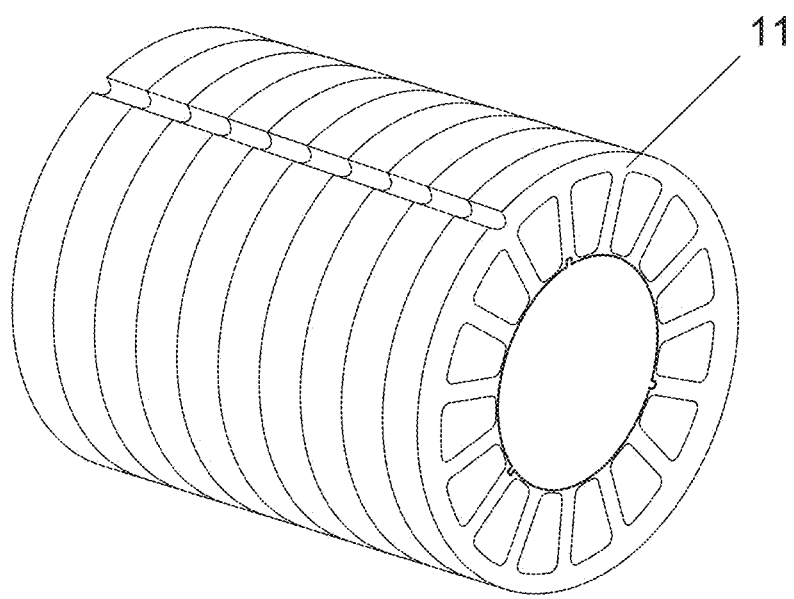
FIG. 6 is a schematic structural diagram of a lamination of a plurality of stator punching sheets.
Figure 7:
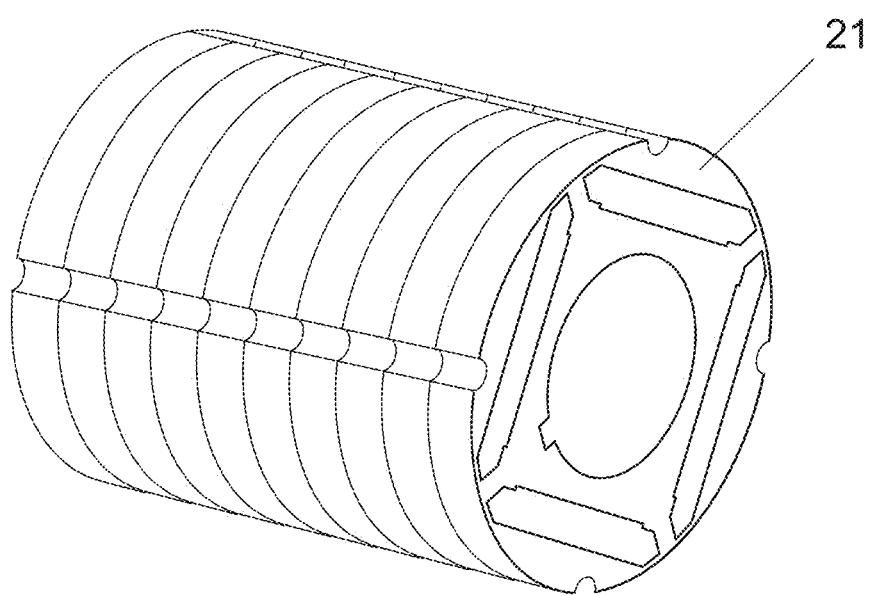
FIG. 7 is a schematic structural diagram of a lamination of a plurality of rotor punching sheets.

As shown in FIG. 3, FIG. 4 and FIG. 7, an embodiment of the present disclosure provides a permanent magnet synchronous submersible motor, comprising a rotor core 2 formed by laminating a plurality of rotor punching sheets 21, and the motor stator as described above; wherein each of the rotor punching sheets 21 is provided with rotor slots 211, and in each of the rotor slots 211 is inserted a permanent magnet 3.

The permanent magnet synchronous submersible motor provided by an embodiment of the present disclosure comprises a rotor core 2 and the motor stator as described above, wherein the rotor core 2 is formed by laminating a plurality of circular rotor punching sheets 21. A conventional AC asynchronous motor is modified into a permanent magnet synchronous motor by providing a permanent magnet rather than a copper conducting bar into the rotor slots 211 of each of the rotor punching sheets 21, such that an excitation magnetic field of the submersible motor is provided by the permanent magnet. Therefore, the rotor does not need an excitation current. Furthermore, the motor has no copper loss of rotor, the efficiency of the submersible motor is improved, and compared with an asynchronous motor, electric energy is saved at any rotational speed point. This advantage is especially obvious when the rotational speed is relatively low. In addition, by replacing the rotor winding with a permanent magnet, as compared with an induction motor, the permanent magnet motor has a greatly enhanced airgap magnetic field and significantly reduced volume and weight, thereby reducing the consumption of manufactured materials and production costs. Other technical advantages of the permanent magnet synchronous submersible motor provided by the present disclosure are the same as the technical advantages of the motor stator as described above, which will not be described herein.

Further, as shown in FIG. 3, in this embodiment, it is further arranged that the rotor slots 211 are four in number and are elongated in shape, a straight fine, where a midperpendicular of a long side of the rotor slot 211, intersects a central axis of one corresponding rotor punching sheet 21, and the four rotor slots 211 are uniformly distributed on a circumference of each of the rotor punching sheets 21.

The rotor slot 211 for placing the permanent magnet has a length of 24 mm and a width of 4.5 mm, which length and width correspond to the width and height of the permanent magnet, respectively.

Fixing four permanent magnets rather than copper conducting bars in the four rotor slots 211, forms two pairs of N (North) poles and S (South) poles to generate rotor excitation. Therefore, the rotor does not need an excitation current. Furthermore, the motor has no copper loss of rotor, which further improves the efficiency of the motor.

Further, in this embodiment, it is arranged that the permanent magnet 3 is neodymium iron boron or samarium cobalt, wherein the neodymium iron boron or samarium cobalt is inserted at the center position of each of the rotor slots 211 and epoxy resin 4 is fixedly provided at either end of each of the rotor slots 211.

Neodymium iron boron is a type of magnet, which contains lots of rare earth element neodymium, iron and boron and is characterized by hardness and brittleness. Due to the susceptibility to oxidative corrosion of the surface, the neodymium iron boron must be subjected to surface coating treatment. As one kind of rare earth permanent magnet material, neodymium iron boron has extremely high magnetic energy, high coercive force and high energy density. In addition, neodymium iron boron also has a high performance-price ratio and good mechanical properties.

In this embodiment, neodymium iron boron is used to provide a magnetic field, so the airgap magnetic field of the permanent magnet motor is further enhanced and the volume and weight of the permanent magnet motor can be greatly reduced, as compared with an induction motor.

In addition, epoxy resin 4 generally refers to a polymer compound containing an epoxy group in its molecular structure. Cured epoxy resin 4 has good physical and chemical properties, has excellent adhesion strength to surfaces of metal and non-metal materials, good dielectric property, low deformation shrinkage rate, and the products where the epoxy resin is used have good dimensional stability, high hardness, good flexibility, and are stable with respect to base and most solvents. Therefore, cured epoxy resin is widely used in national defense and various other sectors of the economy for uses such as casting, impregnation, laminate material, adhesive, coating, and other similar uses.

In this embodiment, the epoxy resin 4 serves as a laminate material and an adhesive for fixing the neodymium iron boron magnet 3 to the rotor slot 211 and to prevent the neodymium iron boron magnet 3 from being damaged due to rocking relative to the rotor slot 211, which ensures the stability of the structure of the rotor core 2.

Specifically, as shown in FIG. 4, in this embodiment, a rotor stopper 22 is fixedly provided at either end of the rotor core 2, and the rotor stopper 22 has a thickness of 2 mm-3 mm.

The rotor stoppers 22 are laminated with the rotor punching sheets 21 at the two ends of the rotor core 2, respectively, so as to prevent magnetic leakage.

As a preferred structure of the present embodiment, the rotor stopper 22 is a stainless-steel plate.

The stainless-steel plate is a ring-shaped plate and the parameters such as an outer diameter and an inner diameter are the same as those of the rotor punching sheets 21.

Further, as shown in FIG. 4, in this embodiment, it is further arranged that the rotor core 2 has ten segments in total, wherein adjacent segments of rotor core 2 are connected through a centralizing bearing 6 and a motor shaft 5 is fitted in a cavity 16 formed by the ten segments of the rotor core 2.

Specifically, the motor shaft 5 is made of a high-quality alloy and mainly serves as the key connection with the rotor core 2 to form an integral structure and for the transmission of the output torque from the rotor core 2. The hollow structure of the shaft allows motor oil to circulate therein, so as to ensure lubrication and heat dissipation of the motor bearing.

The centralizing bearing 6 serves the function of centralization (stabilization, alignment) and to prevent the elongated rotor core from rubbing against the motor stator.

When employing the above preferred parameters and structure, the submersible motor provided in this embodiment has the following specific advantages.

Figure 8:
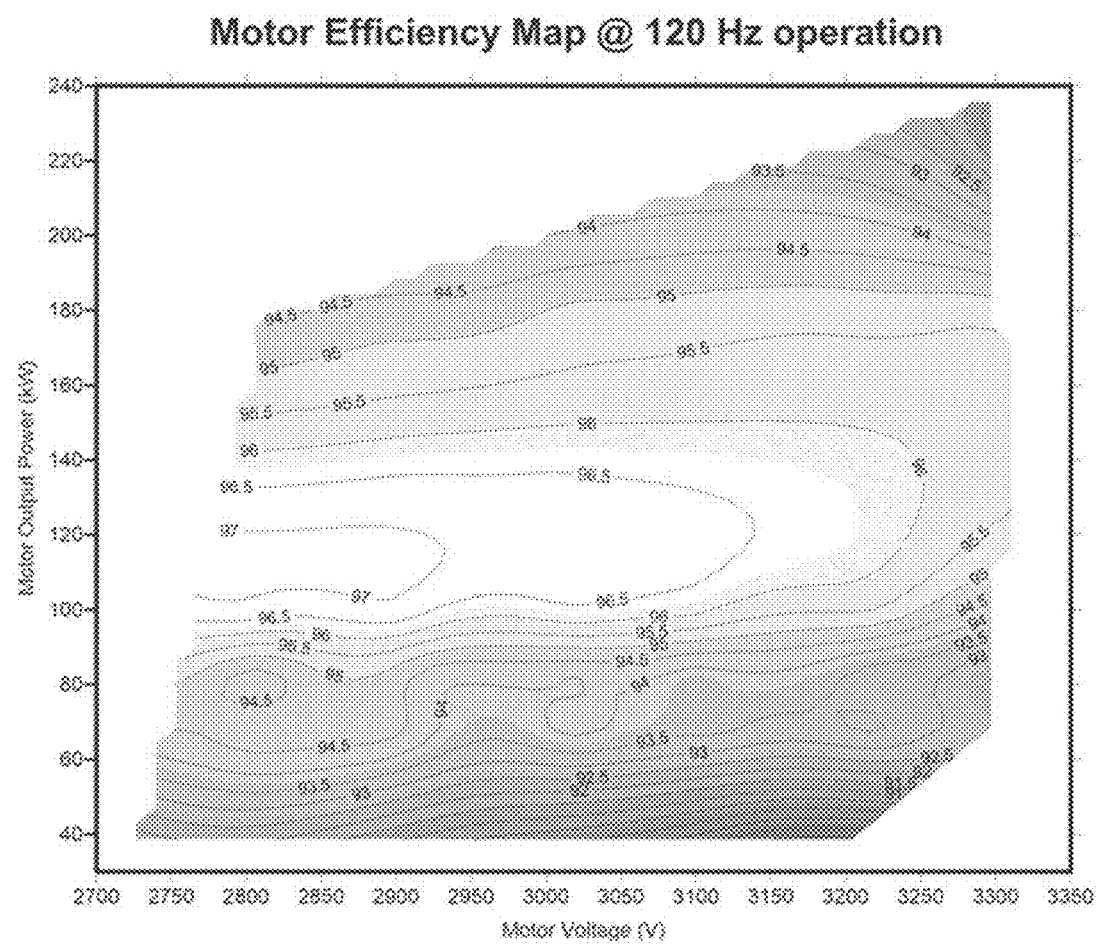
FIG. 8 shows the efficiency curves of the motor according to an embodiment of the present disclosure, according to different power outputs at different voltages.

1. As shown in FIG. 8, the efficiency value of the motor is improved. Compared with 80% of the international advanced level, the efficiency value of this submersible motor is about 95.1%.

FIG. 8 shows the efficiency curves of the motor according to different power outputs at different voltages.

Figure 9:
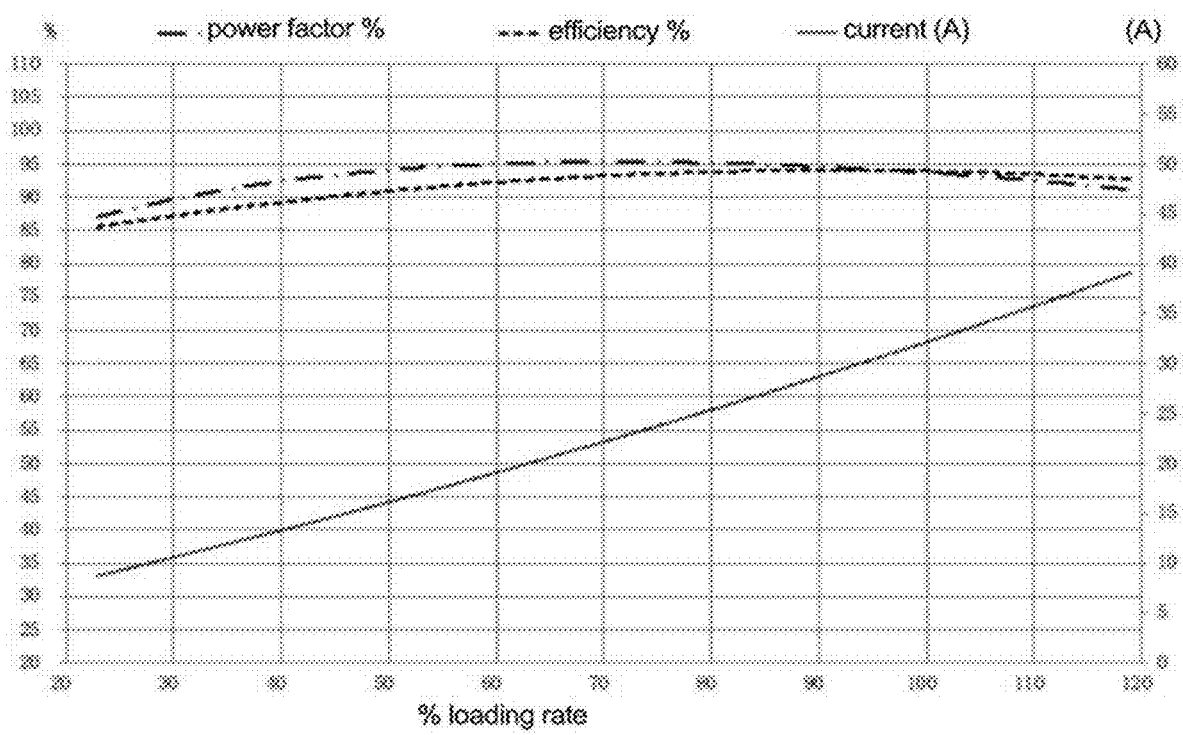
FIG. 9 shows the characteristic curves of the motor according to an embodiment of the present disclosure, which are obtained after practical tests.

2. As shown in FIG. 9, the power factor is improved. At present, the existing reference value in the industry is about 0.86. The power factor of this submersible motor can reach 0.93.

FIG. 9 shows the characteristic curves of the motor obtained after practical tests. In the full loading rate section, the power factor and efficiency of the motor rapidly rise to 90% or above and are maintained at a very high level.

3. The volume becomes smaller. Conventional motors are bulky, the length of an ordinary motor is about 10 meters. However, the length of this submersible motor is only about 4.6 meters.

4. The weight is less and less material is used. The manufacturing of a traditional motor requires high material consumption. The submersible motor provided in this embodiment can save material consumption by nearly 50%.

5. The submersible motor provided in this embodiment enables unhindered starting with a converter in any control mode. The existing permanent magnet submersible motors can only be started by a vector-controlled converter. The present disclosure realizes arbitrary starting with a V/F-controlled converter. As shown in the table below, during the test, V/F control and six square waves were successively used. The start synchronization frequency and acceleration duration were adjusted and at the same time, the load was increased to a given power and unhindered starting was always achieved during the test.

The table below shows the starting test, in which the converter uses the V/F control and six square wave inversion mode. The test was conducted at different startup frequencies and acceleration durations, with the load being increased to a given power, and unhindered starting was always achieved.

| Start frequency | Hertz | 3 | 5 | 7 | 10 | 10 |
| --- | --- | --- | --- | --- | --- | --- |
| Acceleration duration | Second | 20 | 20 | 20 | 20 | 15 |
| Set speed | Hertz | 100 | 100 | 100 | 100 | 100 |
| Load | Kilowatt | 137 | 137 | 137 | 137 | 137 |
| Voltage | Volt | 2500 | 2500 | 2500 | 2500 | 2500 |

Finally, it should be noted that the above embodiments are only used to illustrate the technical aspects of the present disclosure, rather than limit the embodiments. Although the present disclosure has been described in detail with reference to the foregoing embodiments, it should be understood by a person of ordinary skill in the art that the technical aspects described in the embodiments can still be modified or equivalent substitutions can be made to some or all of the technical features and the modifications or substitutions would not change the substance of the scope of the embodiments of the present disclosure.

What is claimed is:

1. A motor stator, comprising a stator core formed by laminating a plurality of stator punching sheets, each of the stator punching sheets is provided with an odd number of stator slots, and any two of a X-phase coil, a Y-phase coil and a Z-phase coil are wound in each of the stator slots, wherein each of the stator slots is a closed stator slot, and a shortest distance between the stator slot and an inner wall of each of the stator punching sheets constituting an empty circle is between 0.2 mm-0.5 mm to reduce a harmonic and a cogging effect and to reduce a vibration and a noise of a permanent magnet synchronous submersible motor.

2. The motor stator according to claim 1, wherein the shortest distance between the stator slot and the inner wall of each of the stator punching sheets constituting the empty circle is 0.2 mm.

3. The motor stator according to claim 1, wherein each of the plurality of stator punching sheets has an outer diameter of about 100 mm and an inner diameter of about 52 mm and the stator slots are 15 in number to distribute an airgap magnetic field and reduce the harmonic effect of the permanent magnet synchronous submersible motor.

4. The motor stator according to claim 3, wherein the stator slots are uniformly distributed on a circumference of each of the stator punching sheets.

5. The motor stator according to claim 1, wherein the stator slots are uniformly distributed on a circumference of each of the stator punching sheets.

6. The motor stator according to claim 1, wherein each of the stator slots is a pear-shaped slot.

7. The motor stator according to claim 1, wherein a housing encloses the stator core.

8. The motor stator according to claim 1, wherein two first positioning grooves with a square shape are provided on an inner wall of each of the stator punching sheets and one second positioning groove with a semicircular shape is provided on an outer wall of each of the stator punching sheets.

9. A permanent magnet synchronous submersible motor, comprising a rotor core formed by laminating a plurality of rotor punching sheets and the motor stator according to claim 1, wherein each of the rotor punching sheets is provided with rotor slots and a permanent magnet is inserted into each of the rotor slots.

10. The permanent magnet synchronous submersible motor according to claim 9, wherein the permanent magnet submersible motor is started with a conventional variable frequency (V/F)—controlled converter.

11. The permanent magnet synchronous submersible motor according to claim 9, wherein the rotor slots are four in number and are elongated in shape, a straight line, where a midperpendicular of a long side of the rotor slot, intersects a central axis of one corresponding rotor punching sheet, and the four rotor slots are uniformly distributed on a circumference of each of the rotor punching sheets to reduce a volume and a weight of the permanent magnet synchronous submersible motor.

12. The permanent magnet synchronous submersible motor according to claim 9, wherein the permanent magnet is neodymium iron boron or samarium cobalt and the neodymium iron boron or the samarium cobalt is inserted at a center position of each of the rotor slots.

13. The permanent magnet synchronous submersible motor according to claim 9, wherein a rotor stopper is fixedly provided at either end of the rotor core.

14. The permanent magnet synchronous submersible motor according to claim 13, wherein the rotor stopper has a thickness of 2 mm-3 mm.

15. The permanent magnet synchronous submersible motor according to claim 9, wherein the rotor core has ten segments in total, adjacent segments of the rotor core are connected through a centralizing bearing, and a motor shaft is fitted in a cavity formed by the ten segments of the rotor core.

16. The permanent magnet synchronous submersible motor according to claim 9, wherein each of the stator slots is a closed stator slot, and a shortest distance between the stator slot and an inner wall of each of the stator punching sheets constituting an empty circle is 0.2 mm-0.5 mm.

17. The permanent magnet synchronous submersible motor according to claim 16, wherein the shortest distance between the stator slot and the inner wall of each of the stator punching sheets constituting the empty circle is 0.2 mm.

18. The permanent magnet synchronous submersible motor according to claim 9, wherein an epoxy resin is fixedly provided at either end of each of the rotor slots.

19. The motor stator according to claim 10, wherein each of the plurality of stator punching sheets has an outer diameter of about 100 mm and an inner diameter of about 52 mm and the stator slots are 15 in number and the stator slots are uniformly distributed on a circumference of each of the stator punching sheets to distribute an airgap magnetic field and reduce the harmonic effect of the permanent magnet synchronous submersible motor.

* * * * *